United States Patent Office 3,369,006
Patented Feb. 13, 1968

3,369,006
NOVEL MONOMERS AND POLYMERS THEREOF CONTAINING SILOXANE LINKAGES AND PROCESS OF MAKING
Robert Brown, Beltsville, Md., assignor to the United States of America as represented by the Secretary of the Navy
No Drawing. Filed Jan. 31, 1964, Ser. No. 341,805
11 Claims. (Cl. 260—80)

ABSTRACT OF THE DISCLOSURE

A high temperature resistant machinable and moldable polyorganohalosiloxane and an unsaturated organohalosilane monomer and the method of making the siloxane from the silane by free radical polymerization.

The invention described herein may be manufactured and used by or for the Government of the United States of America for governmental purposes without the payment of any royalties thereon or therefor.

This invention is directed to the preparation of a novel class of monomers and polymers. More particularly, the invention is concerned with the preparation of monomers containing both siloxane linkages and polymerizable unsaturated groups and which correspond to the following structural formulae:

(1)

and
(2)
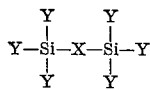

wherein

X is the residue of an unsaturated or saturated alkyl, aryl or alkaryl radical,
Si is silicon, and
Y is the residue of an unsaturated alkyl, aryl or alkaryl halohydrin derivative.

Silicones are a large and important class of synthetic polymers possessing a diversity of useful properties. These materials are generally prepared by the hydrolysis of organochlorosilanes but since the silicon-chlorine bond is reactive toward materials other than water it is theoretically possible to form compounds analogous to silicones by the reaction of organohalosilanes with compounds other than water.

Accordingly, it has been found that novel monomers, and polymers thereof, may be prepared by the reaction of unsaturated epoxide compounds with organohalosilanes.

The preparation of the monomers to which this invention is directed is of a general nature and requires neither elaborate equipment nor complex laboratory procedures. Since the reaction is exothermic, however, normal precautions are necessary to avoid build-up of excessive reaction rates.

The novel monomers of this invention are prepared by the reaction of unsaturated alkyl, aryl or alkaryl unsaturated epoxides, such as glycidyl methacrylate or glycidyl acrylate, with a saturated or unsaturated alkyl, aryl or alkaryl halosilane such as allyl trichlorosilane, vinyl trichlorosilane and 1,2-bis(trichlorosilyl) ethane and the iodine, bromine and fluorine substituted derivatives thereof.

Generally, the reactants are mixed in stoichiometric proportions, i.e. 3 moles of the organohalosilane to 1 mole of the epoxide compound.

The following examples, illustrating embodiments of the novel monomers contemplated, and the subsequent examples illustrating the polymers obtained therefrom are merely for the purpose of illustration of the invention and are not intended, nor should they be construed as, limitations thereof.

Example I

Glycidyl methacrylate in an amount of 25.04 gms. (0.175 mole) was slowly added from a dropping funnel to 10.25 gms. (0.0584 mole) of allyl trichlorosilane in a round-bottom, three-necked flask equipped with a stirrer and thermometer. The exothermic reaction was controlled by cooling the flask and keeping the temperature of the reaction below about 55° C. The reaction was complete in one hour and a liquid monomeric product was obtained which corresponded to the formula

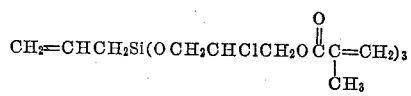

Example II

Example I was repeated utilizing vinyl trichlorosilane in lieu of allyl trichlorosilane in a molar proportion of 3 moles of silane to 1 mole of glycidyl methacrylate. Upon completion of the reaction a liquid monomeric compound corresponding to the following formula was obtained:

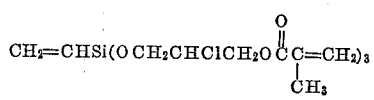

Example III

The procedure of Example I was repeated utilizing six moles of 1,2-bis(trichlorosilyl) ethane to 1 mole of glycidyl methacrylate. At the completion of the reaction there was obtained a liquid monomeric product corresponding to the following formula:

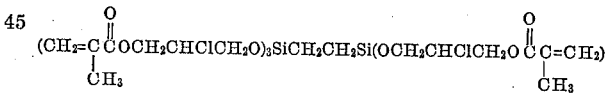

In the above examples, other epoxide-containing compounds and other halo-substituted silanes may be used to obtain similar reaction products.

The mechanism of the reaction is not precisely known but apparently the epoxide compound, such as glycidyl methacrylate, initially reacts with the trace amount of hydrogen halide, which is present in all except the most highly purified and carefully protected halosilanes, to form the corresponding chlorohydrin which then reacts with the silane to form the product. It is to be understood, however, that the invention is neither to be limited nor construed by the above theoretical considerations.

Example IV

The monomers of the preceding examples were polymerized by either heating or by the addition of a catalyst. If heat is used, the temperature may be from about 70–100° C. and should be maintained for 24 hours or longer. If a catalyst is used, a free radical type catalyst such as MEK peroxide or azobisisobutyronitrile should be used. Polymerization of the monomers of Examples I, II and III yielded highly cross-linked, thermoplastic polymers which had no discernible melting points but which decomposed at about 275° C. In appearance, the product is colorless and glassy and extremely hard. The polymers were amorphous and insoluble in common solvents.

By subsequently hydrolyzing the polymer, water is apparently split out between the silicon bonds imparting flexibility not present in the initial product. Further, since the monomers may be unsaturated and also contain polymerizable methacrylate groups (such as the products of Examples I and II), they may be homopolymerized or they may be copolymerized with other unsaturated compounds such as diolefins exemplified by butadiene and isoprene, halodiolefins such as chloroprene, monoolefins such as ethylene, propylene, butene and with vinyl aromatics such as styrene and other similar polymerizable compounds.

The polymers of the invention are more highly temperature resistant than commonly known thermosetting resins and thus find use in high temperature military applications such as in radomes for supersonic aircraft. The polymeric products of the invention may, moreover, be machined and molded to produce a variety of military and nonmilitary articles such as diaphragms for water-activated mines, etc.

Obviously, many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. A compound of the formula

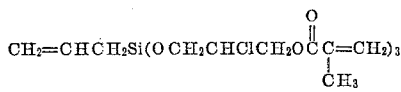

2. A compound of the formula

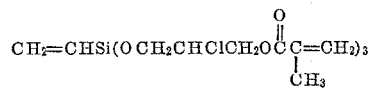

3. A compound of the formula

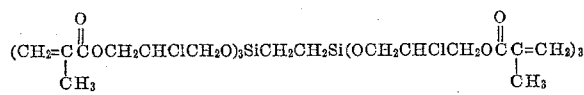

4. The method of preparing an unsaturated polymerizable monomer containing siloxane linkages comprising mixing in the absence of other reactive ingredients an unsaturated epoxide compound selected from the group consisting of glycidyl methacrylate and glycidyl acrylate with an unsaturated organohalosilane selected from the group consisting of allyl trichlorosilane, vinyl trichlorosilane, and the corresponding bromine, fluorine, and iodine compounds whereby the said compounds react to form the said monomers.

5. The method of preparing an unsaturated polymerizable monomer containing siloxane linkages comprising mixing in the absence of other reactive ingredients an unsaturated epoxide compound selected from the group consisting of glycidyl methacrylate and glycidyl acrylate with a saturated organohalosilane selected from the group consisting of 1,2-bis(trichlorosilyl) ethane and the corresponding bromine, fluorine, and iodine compounds whereby the said compounds react to form the said monomer.

6. The method of claim 4 wherein one mole of said epoxide is reacted with three moles of said organohalosilane.

7. The method of claim 5 wherein one mole of said epoxide is reacted with six moles of said organohalosilane.

8. The method of preparing a crosslinked thermosetting polymer which comprises heating, at a temperature of about 70–100° C., a compound represented by the formulae selected from the group consisting of

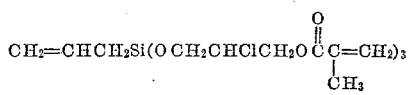

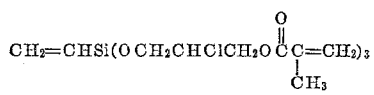

and

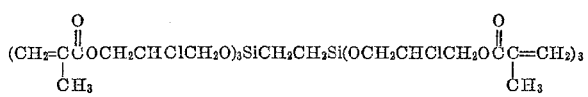

9. The method of preparing a crosslinked thermosetting polymer which comprises reacting a compound represented by the formulae selected from the group consisting of

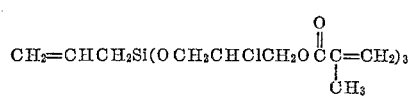

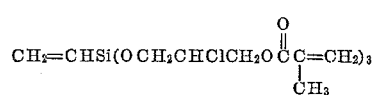

and

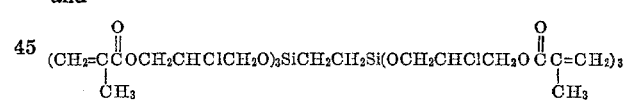

with a free radical catalyst.

10. The crosslinked thermosetting polymer prepared by the method of claim 8.

11. The crosslinked thermosetting polymer prepared by the method of claim 9.

No references cited.

JOSEPH L. SCHOFER, *Primary Examiner.*

J. KNIGHT III, *Assistant Examiner.*